US012632856B2

(12) United States Patent
Cook et al.

(10) Patent No.: US 12,632,856 B2
(45) Date of Patent: May 19, 2026

(54) INSTANT PROVENANCE PLATFORM

(71) Applicants: Brandon Cook, Orange, CA (US);
Christopher Key, Orange, CA (US);
Kwang Hwang, Orange, CA (US);
Austin Cho, Orange, CA (US)

(72) Inventors: Brandon Cook, Orange, CA (US);
Christopher Key, Orange, CA (US);
Kwang Hwang, Orange, CA (US);
Austin Cho, Orange, CA (US)

( * ) Notice: Subject to any disclaimer, the term of this patent is extended or adjusted under 35 U.S.C. 154(b) by 868 days.

(21) Appl. No.: 17/953,131

(22) Filed: Nov. 3, 2022

(65) Prior Publication Data

US 2026/0111885 A1 Apr. 23, 2026

(51) Int. Cl.
*G06Q 20/38* (2012.01)
*G06Q 20/06* (2012.01)

(52) U.S. Cl.
CPC ......... *G06Q 20/3829* (2013.01); *G06Q 20/06* (2013.01); *G06Q 20/385* (2013.01)

(58) Field of Classification Search
CPC .. G06Q 20/3829; G06Q 20/06; G06Q 20/385; G06Q 20/401; G06Q 2220/00; H04L 2209/56
See application file for complete search history.

(56) References Cited

U.S. PATENT DOCUMENTS

| | | | | |
|---|---|---|---|---|
| 10,497,037 | B2 * | 12/2019 | Isaacson | ............ G06Q 30/0613 |
| 10,505,726 | B1 | 12/2019 | Andon et al. | |
| 11,250,493 | B2 * | 2/2022 | Isaacson | ............ G06Q 30/0625 |
| 12,067,575 | B2 * | 8/2024 | Mohassel | ............ G06Q 20/065 |
| 12,169,823 | B1 * | 12/2024 | Khmelev | ........... G06Q 20/4015 |
| 12,205,084 | B1 * | 1/2025 | Stroke | ................ G06Q 20/3829 |
| 12,321,924 | B1 * | 6/2025 | Kurani | .................... G06Q 40/04 |
| 12,380,445 | B1 * | 8/2025 | Khmelev | ........... G06Q 20/3829 |
| 12,505,455 | B1 * | 12/2025 | Eutsler | .............. G06Q 30/0185 |
| 2016/0098730 | A1 * | 4/2016 | Feeney | .................. G06Q 20/20 |
| | | | | 705/71 |
| 2017/0200154 | A1 | 7/2017 | Dubreucq et al. | |
| 2019/0253256 | A1 | 8/2019 | Saab et al. | |
| 2019/0366475 | A1 | 12/2019 | Scarselli et al. | |
| 2021/0184845 | A1 | 6/2021 | Herbert et al. | |
| 2022/0084015 | A1 * | 3/2022 | Fawzy | ............... G06Q 20/3678 |

FOREIGN PATENT DOCUMENTS

KR 1020220113307 A 8/2022

OTHER PUBLICATIONS

Written Opinion of the International Searching Authority for International Patent Application PCT/US2023/032076, dated Dec. 27, 2023, 5 pages.
International Search Report for International Patent Application PCT/US2023/032076, dated Dec. 27, 2023, 3 pages.
The Aura Blockchain Consortium, https://auraluxuryblockchain.com/ from Apr. 20, 2021, 9 pages.

* cited by examiner

*Primary Examiner* — Hosuk Song
(74) *Attorney, Agent, or Firm* — Fish IP Law, LLP; Tomas A. Prieto

(57) ABSTRACT

A system for secure and verifiable transfer of valuable physical goods includes a card that has a public key and one or more private keys that are obscured. When ownership transfer occurs, a private key from the card is revealed and scanned. A computer system then decrypts a blockchain, generates a new block and adds it to the chain to record the transfer of ownership. The card limits the amount of transfers of a good to control the movement of the legitimate goods and preserve provenance.

18 Claims, 7 Drawing Sheets

411

412A

412B

412n

411

412A

412B

412n

INSTANT PROVENANCE PLATFORM

FIELD OF THE INVENTION

The field of the invention is secure verification of product integrity and ownership.

BACKGROUND

The background description includes information that may be useful in understanding the present invention. It is not an admission that any of the information provided herein is prior art or relevant to the presently claimed invention, or that any publication specifically or implicitly referenced is prior art.

In the world of valuable goods, a major challenge is maintaining provenance of a good. Consumers have no way to ensure the products purchased are authentic, what the components or ingredients are, where the raw materials were sourced, and the path it travelled to arrive in my possession. Moreover, once a valuable good has been sold, there is no way for the manufacturer to track or control how the good is transferred, how often it is transferred, or to know whether the good has been destroyed or consumed.

Likewise, for other owners of other copies of a limited edition good, there is no way for them to know exactly how limited their specific good might be in view of whether others are consumed or destroyed.

Thus, there is still a need for a provenance platform that allows for the secure, authenticated transfer of goods in both the real and digital worlds.

SUMMARY OF THE INVENTION

The inventive subject matter provides apparatus, systems and methods in which a physical card is used in connection with a blockchain to verify and track ownership of a physical good.

The systems and methods of the inventive subject matter include a public key affixed to a physical good. The physical good can be a valuable good whose value is at least partially derived from the rarity or limited manufacturing of the good. For example, the physical good can be a limited edition bottle of wine or liquor, a valuable stone, etc.

The inventive subject matter also includes a physical card that include a copy of the public key. The physical card also includes at least two private keys that are obscured by single-use covers (e.g., a scratch-off cover, a decal, etc.).

The systems and methods of the inventive subject matter further includes at least one computing system programmed to keep track of the ownership of the physical good. To do so, the computing system receives a scan of the public key from the card and/or the physical good and generates a first block for a blockchain based on this scan. The blockchain is then encrypted using the first key.

Some time later, when an ownership change is desired, the computing system receives a scan of the first private key from the card, as well as change of ownership information. The computing system then generates a second block for the blockchain, adds the block to the blockchain and then re-encrypts the blockchain.

This process can be repeated for the amount of private keys printed on the card. After the last private key is used, the item can no longer be transferred as per the blockchain. In other words, any transfers beyond that will not be registered and validated with any authority, and provenance is thereafter lost.

In embodiments, the card can include an "end" key which is a private key that serves to signal the exhaustion or destruction of the physical good. When the computing device receives a scan of the end key, it decrypts the blockchain and generates an end block after which no additional blocks can be added.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The Provenance Trilemma (what, when, where) solves for three ownership qualities of every product: infinite vs finite (scarcity count), intangible vs tangible (sourced property) and generic vs unique (artistic beauty). The systems and methods of the inventive subject matter authenticate a product's ownership story by pinpointing its time, place and property in the physical world verified in the digital open & public ledger, coupled with an ownership card acting as receipt and thus providing its provenance layer to its origin story. There is an inventory control narrative as well as consumption narrative that continues to live on the block-chain, forever.

Figure 1:
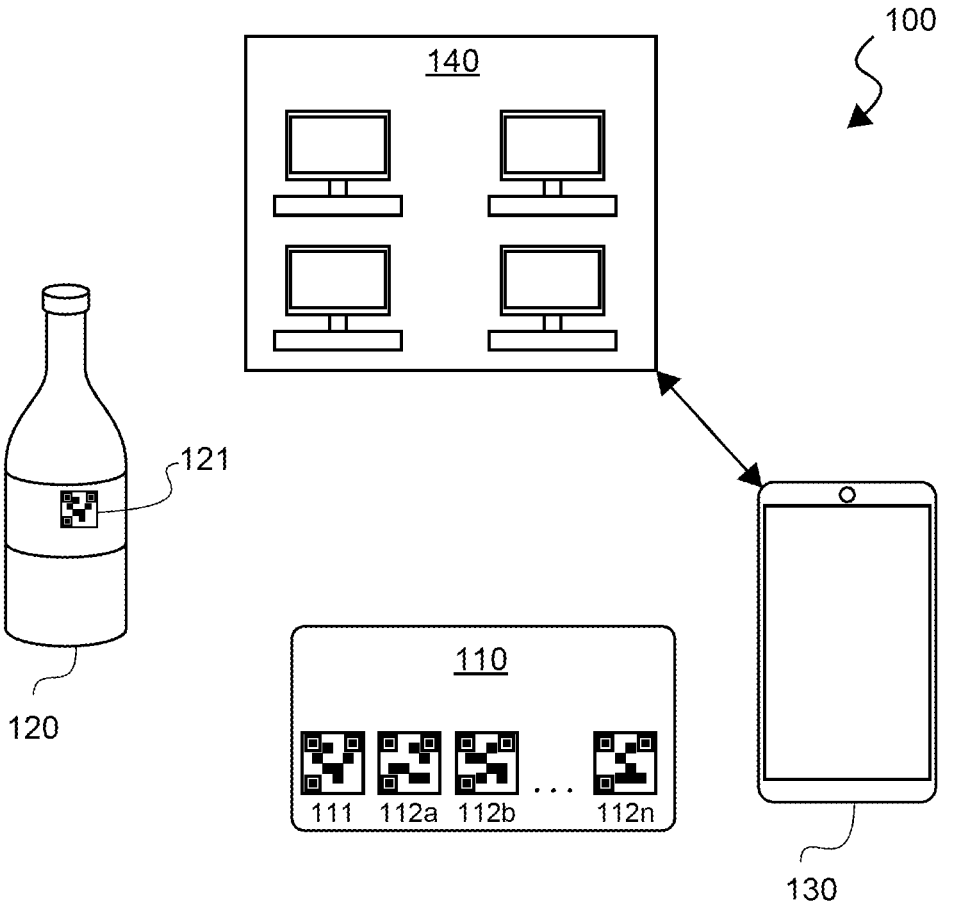
FIG. 1 is a diagrammatic overview of the system according to embodiments of the inventive subject matter.

FIG. 1 is a diagrammatic view of a system 100, according to embodiments of the inventive subject matter.

As seen in FIG. 1, the system 100 includes a card 110. The card 110 includes a visible public key 111 and multiple private keys 112$a$-112$n$ that are covered at the time of the card's manufacture. The card 110 can be made from any suitable materials such as cardstock or other paper product, plastic, metal, etc. In embodiments, the card 110 can be of a size similar to a credit card or driver's license such that it can be carried in an owner's wallet or purse. In other embodiments, the size of the card 110 can be larger to accommodate a greater number of private keys, for display purposes, etc.

The system 100 also includes a physical good 120 (in this case, a limited-edition whiskey bottle) that has a copy 121 of the public key 111 from the card. The system includes a computing device 130 that is capable of reading the public and private keys, and a central computer system 140 that can communicate with the computing device 130. Other examples of physical goods can include limited-edition wines, valuable stones, wearable luxury items, pieces of art, historical artefacts, automobiles, etc. The public key 111 can be printed onto a label accompanying the physical good 120, can be engraved onto the physical good 120 (e.g., engraved or inscribed into the bottom of a bottle or engraved on a handbag), or can otherwise be affixed to the physical good 120.

The public key 111 can include information about the physical good 120 such as a provenance identity number (PIN), a quantity signature that indicates its number within a series (e.g., number 111 out of 10,000). Also included in the public key is an electronic address that leads to the blockchain used to track the ownership and consumption of the good.

In embodiments of the inventive subject matter, the physical good 120 includes a seal that can confirm whether the good is still new versus used. The seal can take on a variety of forms depending on the product. For example, for liquids, the seal can be in the form of a cork or other covering that is broken to access the liquid. For other products, it can be a wrapping that includes a medallion that must be broken to use the product. The seal can have its own machine-readable code that can be scanned, uploaded and added to the blockchain to indicate the start of the use or consumption of the product.

Computing device 130 includes a processor and non-transitory computer-readable memory. Computing device 130 also includes a sensor capable of reading the public keys and private keys used in the inventive subject matter. The sensor can be a camera or other sensor capable of reading a QR code, a barcode, or other machine-readable code. The computing device 130 can also be programmed to detect and read alphanumeric codes captured by the camera. The computing device 130 includes hardware and software necessary for data exchanges over data-exchange networks via wireless and/or wired connections. Though only one user device 130 is shown, it is understood that multiple users accessing the system will have their own devices 130.

The computer system 140 can be one or more computing devices that store information associated with the card 110 and the physical good 120. The computer system 140 includes at least one processor and at least one non-transitory computer-readable medium that stores the instructions that execute the processes described herein. The at least one non-transitory computer-readable medium also stores one or more blockchains associated with each of the physical goods 120 that track the ownership of the good as discussed herein. The computer system 140 can communicate with other computing devices such as devices 130 in order to send and receive information related to the physical goods 120 and the ownership thereof. In embodiments, the computing system 140 can include the computing device 130.

Figure 2A:
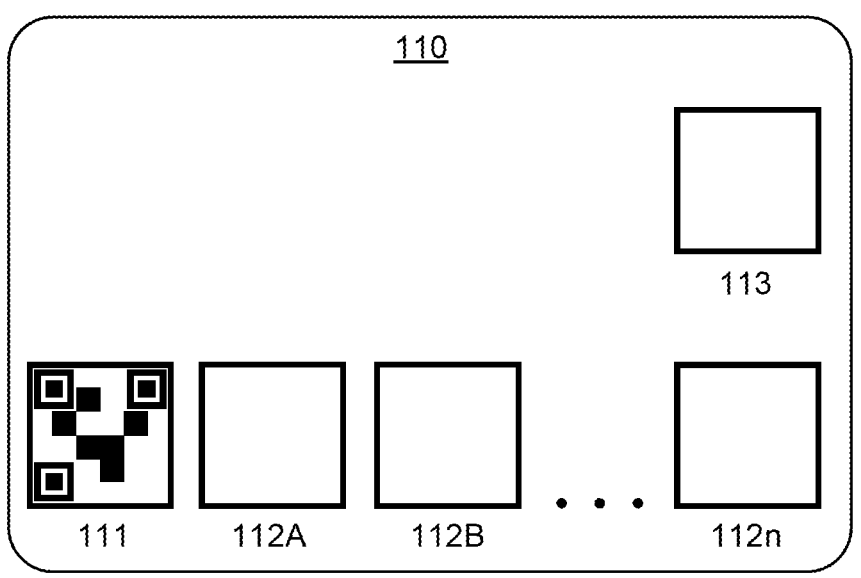
FIGS. 2A and 2B provide a detailed view of a card with and without the covers on the private keys, according to embodiments of the inventive subject matter.
Figure 2B:
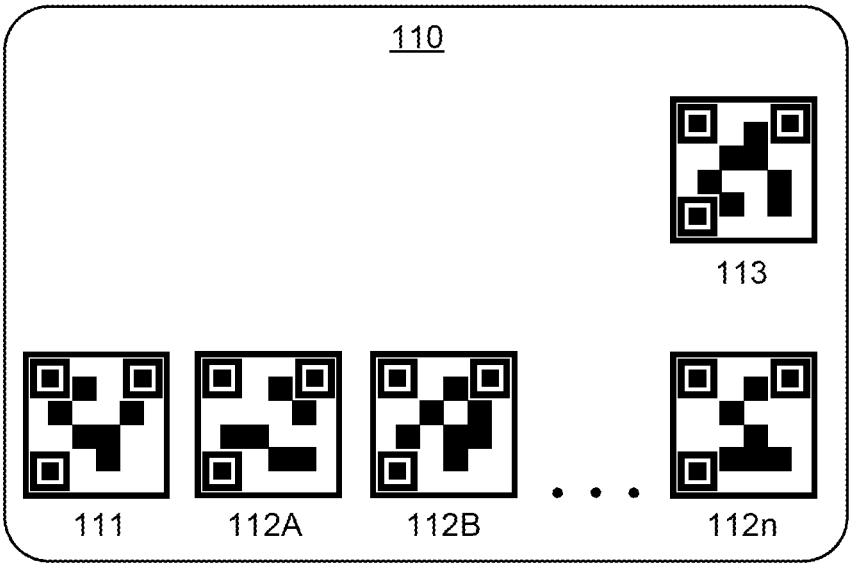

FIGS. 2A and 2B provide a detailed view of the card 110 with and without the covers on the private keys 112, according to embodiments of the inventive subject matter.

As mentioned above and seen in FIGS. 2A-2B, the card 110 includes a public key 111. The public key 111 is preferably a machine-readable code that can be detected and read by a computing device 130 (such as via the camera or other sensor of the computing device 130). In this example, the public key 111 is in the form of a QR code printed on the card 110. Other examples of suitable machine-readable codes can include barcodes, alphanumeric codes, etc. While the public key 111 on the card can be a decal, it is preferred that the public key 111 is printed onto the card 110 such that it cannot be removed without destroying the public key 111 and/or the card 110 itself.

In embodiments, the public key 111 can be covered or otherwise obscured by a single-use cover such as a decal, a scratch-off cover, or other type of cover.

In embodiments, the detection of the public key 111 can include via a manual input of a code by a user on the computing device 130. In embodiments, the public key 111 can by default or via subsequent code input, include details about the physical good 120 such as details about the product's "origin story"—the make, model, year, place of origin, raw materials, miles, etc. which would be written as part of the blocks of the blockchain.

The card 110 also includes at least two private keys 112a-112n (collectively referred to as "private keys 112" herein). Though three private keys 112 are shown in FIG. 2, it is understood that any number of keys can be included, which can be limited by factors such as the card size, a desired amount of maximum owners for a good 120, and the size of the printed keys.

In embodiments of the inventive subject matter, the card 110 can include a final private key 113 that functions as an "end" key. This key serves to establish the final disposition of the good 120 with the computer system 140. this can be due to exhaustion of the good 120, destruction of the good 120, or it can simply be the last allowed owner contemplated by the manufacturer of the good 120. The "end" key will be discussed in greater detail below in the discussion about the flowcharts of the inventive subject matter.

The private keys 112 and end key 113 are preferably in the form of a machine-readable code that can be detected and read by a computing device 130. In this example, the private keys 112 and end key 113 are in the form of a QR code printed on the card 110. Other examples of suitable machine-readable codes can include barcodes, alphanumeric codes, etc. In the embodiment shown here, the private keys 112 and end key 113 are the same type of machine-readable code as the public key 111 (i.e., all QR codes). In other embodiments, the public key 111, one or more of the public keys 112, and/or the end key 113 can be machine-readable codes of different types.

As with the public key 111, the private keys 112 and end key 113 are preferably permanently printed onto the card 110 in such a way that a private key 112 cannot be removed without damaging the card 110 or the key(s) 112.

Each of the private keys 112 and end key 113 is covered or otherwise obscured by a single-use cover. Preferably, the private keys 112 and end key 113 are covered by a scratch-off cover. Alternatively, they can be covered by a decal or other single-use method of coverage. FIG. 2A shows a card with all of the private keys 112 and the end key 113 covered. FIG. 2B shows the card with all of the private keys and the end key 113 uncovered. As seen in FIGS. 2A and 2B, the public key 111 is uncovered. However, in other embodiments, the public key 111 can be covered as well.

The public key 111, the private keys 112 and the end key 113 are all unique to the specific physical good 120. This means that other bottles of the same type will have different cryptographic keys that are unique to each bottle.

In embodiments, the private keys 112 can be invisible to the naked eye by default. For example, the private keys can be printed in ink that is visible only under UV light, or a watermark that only shows up when the private key is moistened.

In embodiments of the inventive subject matter, the card 110 can contain a peel-off copy of the public key 111. This can be used to create a verifiable chain of ownership for a good that is not manufactured or packaged with one. For example, a custom work of art. In these embodiments, the artist can peel off and affix the copy of the public key 111 from the card 110 to the work of art.

In embodiments of the inventive subject matter, a token of value can be attached to the public key 111 at the time of the public key's creation. For example, a Satoshi ($\frac{1}{100,000,000}^{th}$ of a full Bitcoin) can be attached to the public key 111 as a form of a "good faith" deposit or authentication commitment that can be claimed at the consumption or "end" of the physical good 120. In a further embodiment, an end user of the physical good 120 can elect to destroy the token by sending it to a used public key, thus rendering it unusable.

In alternative embodiments of the inventive subject matter, it is contemplated that the card 110 can be a digital card that can be downloaded to a user's device. Thus, the card 110 can include a visual representation of the public key 111. As the ownership of the item is transferred, the private keys can be displayed on the digital card on the new owner's device. In these embodiments, it is contemplated that a user can have a digital wallet that can include the various cards corresponding to physical items that a user owns. These embodiments do not share some of the benefits of a purely physical card mentioned elsewhere herein.

In these embodiments that use a digital card, an app (such as the wallet app) can be used to order more private keys 112 that can be transferred electronically to the app for additional transfers.

Figure 3:
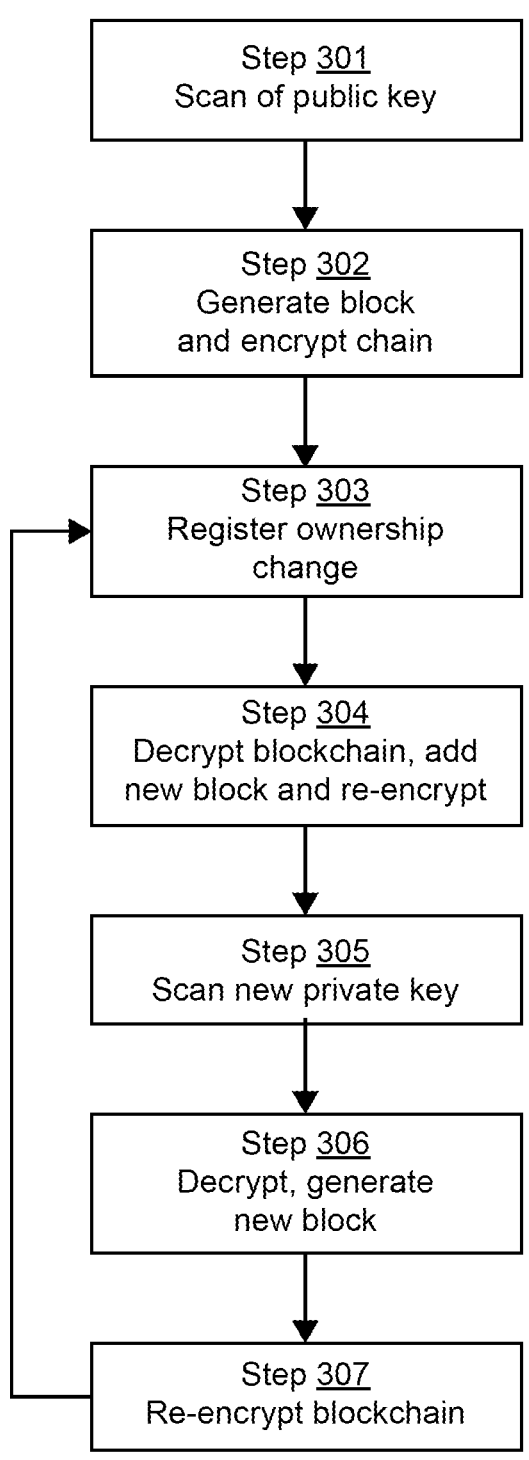
FIG. 3 is a flowchart illustrating the execution of processes according to embodiments of the inventive subject matter.

FIG. 3 provides a flowchart of the process implemented in embodiments of the inventive subject matter.

At step 301, the computer system 140 receives a scan of the public key 111 associated with the good 120 and adds the public key 111 along with other information associated with the good 120. The additional information can include the name of the good, a serial number, a batch number or other limited edition identifier, a date of manufacture, etc.

At step 302, the computer system 140 generates a block to start a blockchain for the good 120 based on the information associated with the good 120, and encrypts the blockchain with the public key 111.

In embodiments of the inventive subject matter, the blockchain for the good 120 has already been generated and includes blocks related to the manufacturing and transport of the good 120. Thus, at this stage the block of step 302 is added to the existing blockchain and then the blockchain is encrypted using the public key 111.

At this stage of the process, the good 120 is not yet "owned" by anyone as per the records of computer system 140. In other words, it is still in the process of arriving to a point of sale to be purchased by the first owner. In embodiments, the good 120 is packaged together with the card 110, such that the first purchaser of the good 120 also acquires the card 110.

At some point, the good 120 is purchased. The new (first) owner also acquires the card 110. If the card 110 is not included with the good 120, the first owner can obtain it via physical mail from the manufacturer or seller of the good 120.

At step 303, the first owner registers their ownership of the good 120 with the computing system 140. To do so, the first owner scratches off the first private key 112a and scans it with their computing device 130. The computing device 130 scans the private key 112a and sends it, along with ownership change information to the computer system 140. The ownership change information can be obtained from the first owner via an app, a website or other form of data entry. The ownership change information can include information identifying the first owner, the date of the ownership change, a location of the ownership change (which can be obtained from a GPS or other location service on-board the computing device 130), and other identifying information.

In embodiments, the physical good 120 can be a good made for a particular owner by special order. In these embodiments, the ownership information can be added to the blockchain before the actual delivery. Thus, in these embodiments, the step 303 would be performed when the first ownership change occurs (when the first owner transfers ownership to a subsequent owner) rather than at delivery to the first owner.

At step 304, the computer system 140 uses the private key 112a to decrypt the blockchain, generate a new block with the first owner's ownership change information, add the new block to the blockchain, and re-encrypt the blockchain.

At some time later, the first owner decides to sell or otherwise divest themselves of ownership of the physical good 120. When the possession of the card 110 is passed to a second owner, the second owner can register their ownership with the computer system 140.

At step 305, the second owner removes the cover from the second private key 112b, and uses their own computing device 130 to scan the private key 112b and sends it, along with ownership change information to the computer system 140.

Step 306 functions in the same manner of step 304. The computer system 140 uses the second private key 112b to decrypt the blockchain, generate a corresponding second new block with the second owner's ownership change information, and then add the second new block to the blockchain. Then, the computer system 140 re-encrypts the blockchain at step 307.

For each subsequent change of ownership, as long as additional private keys 112 remain on the card, the steps 305-307 can be repeated to record the changes in ownership.

The re-encryption performed by the computer system 140 can happen in one or more of several ways. In embodiments, the computer system 140 uses the same public key 111 to reencrypt the blockchain. In these embodiments, the computer system 140 keeps track of the private keys 112 used and prevents a re-use of the same private key for decryption.

In other embodiments, the computer system 140 stores public keys that correspond to the subsequent private keys 112 after the first one (because that one matches up with the public key 111 that is printed on the card 110) and uses these stored public keys to encrypt the blockchain such that it can be unencrypted by the subsequently submitted private key 112. These public keys are generated and provided to the computer system 140 (or generated by the computer system) at the same time as the generation of the private keys 112, and thus are never subsequently exposed to public interception since these public keys never leave the computer system 140.

In another embodiment, each private key 112 is used as the public key for the subsequent private key. For example, after using private key 112a to decrypt the blockchain at step 304, the computer system 140 uses the same key 112a as a public key to reencrypt the blockchain. The private key for this public key 112a would be private key 112b. Thus, at step 306 the computing device 140 uses the second private key 112b to decrypt the blockchain that was encrypted using key 112a.

Authenticated ownership of the physical good 120 can be transferred for as many private keys 112 are printed on the card 110. In most embodiments, authenticated transfers will simply no longer be possible after the final private key 112 is used because there will be no additional keys with which to decrypt the encrypted blockchain. In some embodiments, the final private key 112 includes an identifier that is transferred to the computing system 140 when the final private key 112 is scanned. When this key 112 is received by the computing device 140 and the final ownership transfer recorded, the computing system 140 can add a data tag to the blockchain indicating that the final ownership has been reached.

As noted above, in embodiments of the inventive subject matter, the card 110 can include an end key 113. The end key 113 is used in the event of the destruction or consumption of the physical item 120. The end key 113 includes the private key needed to decrypt the blockchain as well as information that identifies the key as the end key 113. When the computing system 140 receives the end key 113, it decrypts the blockchain with the end key 113 and generates a special block that is devoid of ownership information. This special block can, in embodiments, include a date and location of destruction/exhaustion based on the date/time and location received from the scanning device 130. Then, the end key 113 can be used to re-encrypt the blockchain. The blockchain itself can include a data tag that denotes the good 120 as destroyed/consumed. Because there is no additional decryption key that works to decrypt the blockchain, a user could not use keys 112 still remaining on the card to transfer ownership.

As discussed above, the physical good 120 can be one of a limited production run. As used herein, a limited production run is intended to refer to a production run that is purposefully limited to a pre-determined number of goods produced and/or only produced for a limited amount of time such that the total amount produced is known and tracked. In embodiments of the inventive subject matter, the computer system 140 includes a database of all of the good from the production run, including a tally of existing goods.

In these embodiments, the computer system 140 is programmed to edit the total number in response to receiving a scan of an end key 113 and/or receiving a scan of a final private key 112 for a particular physical good 120. In this case, the computer system 140 can keep track of exactly how many of the goods 120 still exist from the production run and how many are still transferable via the system.

The systems and methods of the inventive subject matter provide the ability to monitor, track and verify ownership in both the real-world (offline) and online environments. A purely online environment lacks an ability to provide on-site ownership information without constant access to communications equipment. A purely off-line ownership tracking system lacks the security and traceability of the online counterparts. The systems and methods of the inventive subject matter solve the limitations of both of these environments by linking a physical record of ownership to the immutability of the blockchain that is maintained and modified online.

In embodiments of the inventive subject matter, a digital twin of the physical good 120 can be minted by the computer system 140 and stored accordingly. A digital twin can be a digital token such as an NFT that represents the physical good's appearance in the real world. This can serve as a receipt for the physical good and be stored in the blockchain for the physical good that contains details associated with the real-world product.

In the embodiments discussed herein, the card 110 contains a finite amount of private keys 112. As discussed herein, when the private keys 112 are exhausted, the ability to transfer the product ends. However, in other embodiments it is contemplated that a product 120 can have a limitless amount of private keys 112. In these embodiments, additional cards 110 with more private keys 112 can be ordered and mailed to the current owner of the physical good 120.

Figure 4A:
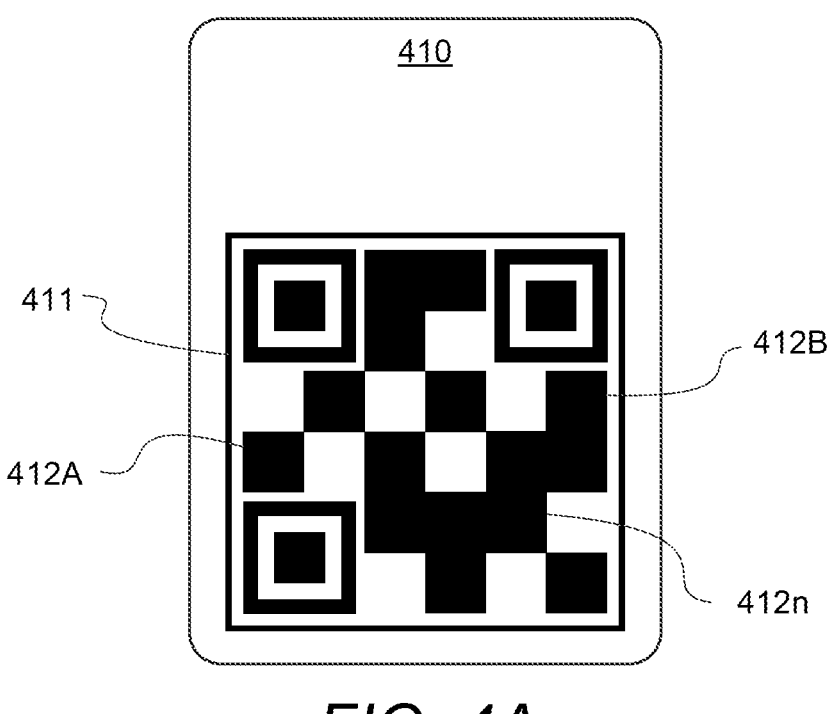
FIGS. 4A and 4B provide views of a card according to an alternative embodiment of the inventive subject matter.
Figure 4B:
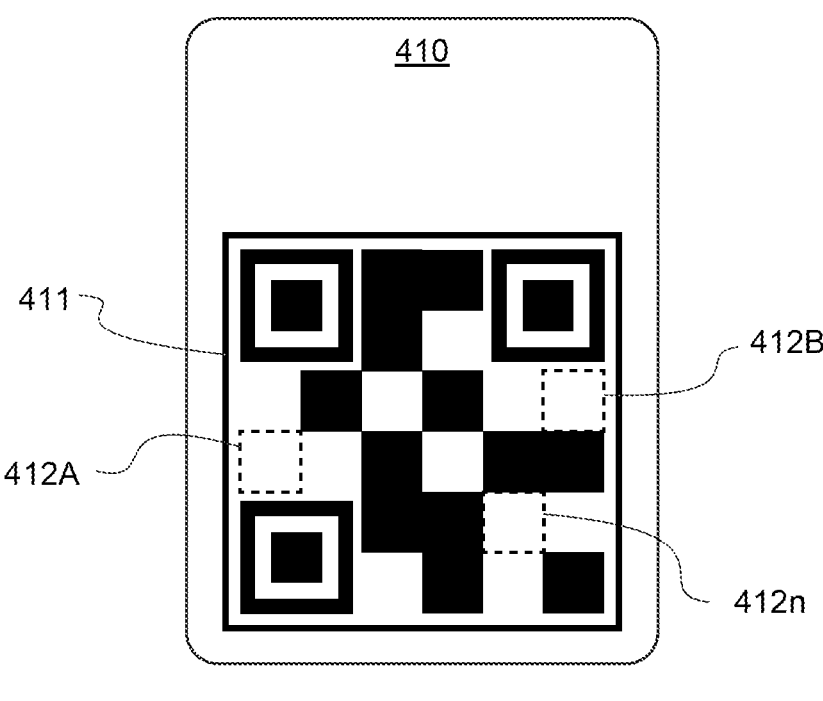

FIGS. 4A and 4B provide a view of a card 410 according to an alternative embodiment of the inventive subject matter.

In the embodiment, the public key 411 is a large machine-readable code printed on the card. In the example of FIGS. 4A-4B, the machine readable code is a QR code. In embodiments, the public key 411 covers at least 50% of the area of the card 410. In other embodiments, the public key 411 covers at least 75% of the area of the card 410. In still other embodiments, the public key 411 covers at least 90% of the area of the card 410.

In these embodiments, the private keys are revealed by removing a single-use covers 412A-412n that change the shape of the machine-readable code. FIG. 4B shows the QR code with all of the covers removed (denoted by the broken lines). Thus, with the removal of each of the covers 412A-412n, a new private key is revealed.

With each change of ownership, one of the covers 412 is removed. This changes the visible shape of the QR code. Thus, when ownership of the physical good 120 changes, the new owner removes the next cover and scans the "new" QR code. Then the system processes the change in ownership in accordance with the steps of FIG. 3 discussed above. The astute reader will notice that the example of FIG. 4B is at the end of the ownership trail in that all of the private keys have been used.

In the embodiment of FIGS. 4A-4B, the contemplated single-use covers are adhesives that can have print on them. In the illustrative example shown in the figures, the covers are relatively simple in that they replace squares in the QR code. However, the covers can have more complex printed patterns that make it virtually impossible for the covers to be placed back on the card in such a way that the prior QR code is properly restored.

In other embodiments of FIGS. 4A-4B, the single-use covers can be scratch-off covers that reveal a different pattern underneath when removed.

Figure 5A:
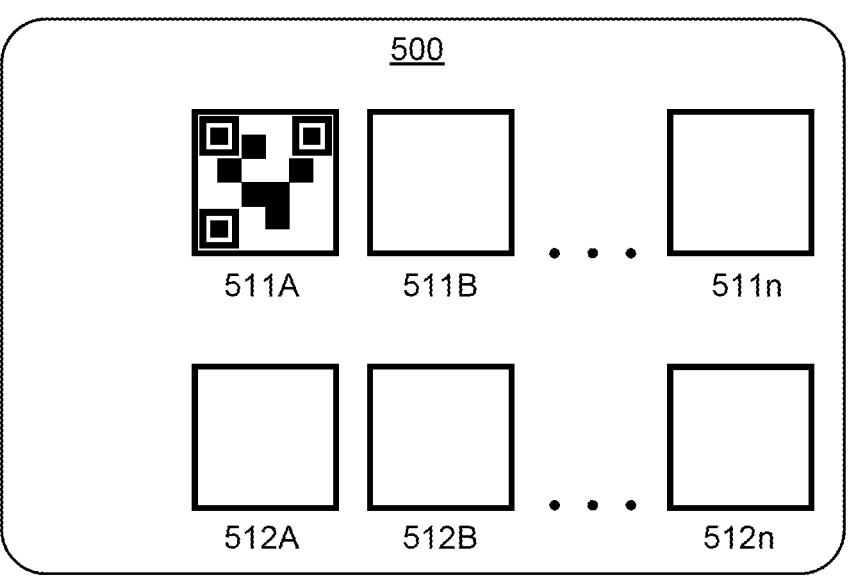
FIGS. 5A and 5B show a card according to other embodiments of the inventive subject matter.
Figure 5B:
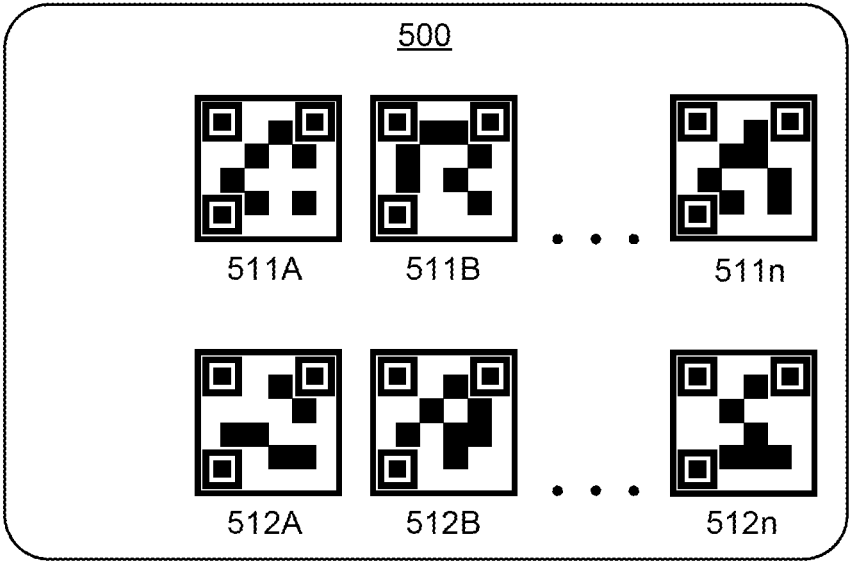

FIGS. 5A-5B show a card 500 according to other embodiments of the inventive subject matter.

Card 500 includes a plurality of public keys 511a-511n and a corresponding plurality of private keys 512a-512n. Thus, public key 511a corresponds to private key 512a, public key 511b corresponds to private key 512b and so on.

Each of the public keys 511a-511n are information addresses for a corresponding digital record corresponding to the real-world good. In embodiments, each of the public keys 511 have a unique information address that correspond to different digital records. This way, sequential ownership of the digital good can be tracked by looking at the current actual digital record and "false" assertions of ownership (such as from prior used public keys) can be ignored.

FIG. 5A shows the card 500 with only the first public key 511a visible and the private keys and public keys obscured via a covering such a scratch-off covering.

FIG. 5B shows the card 500 with all of the public keys 511 and private keys 512 visible.

Figure 6:
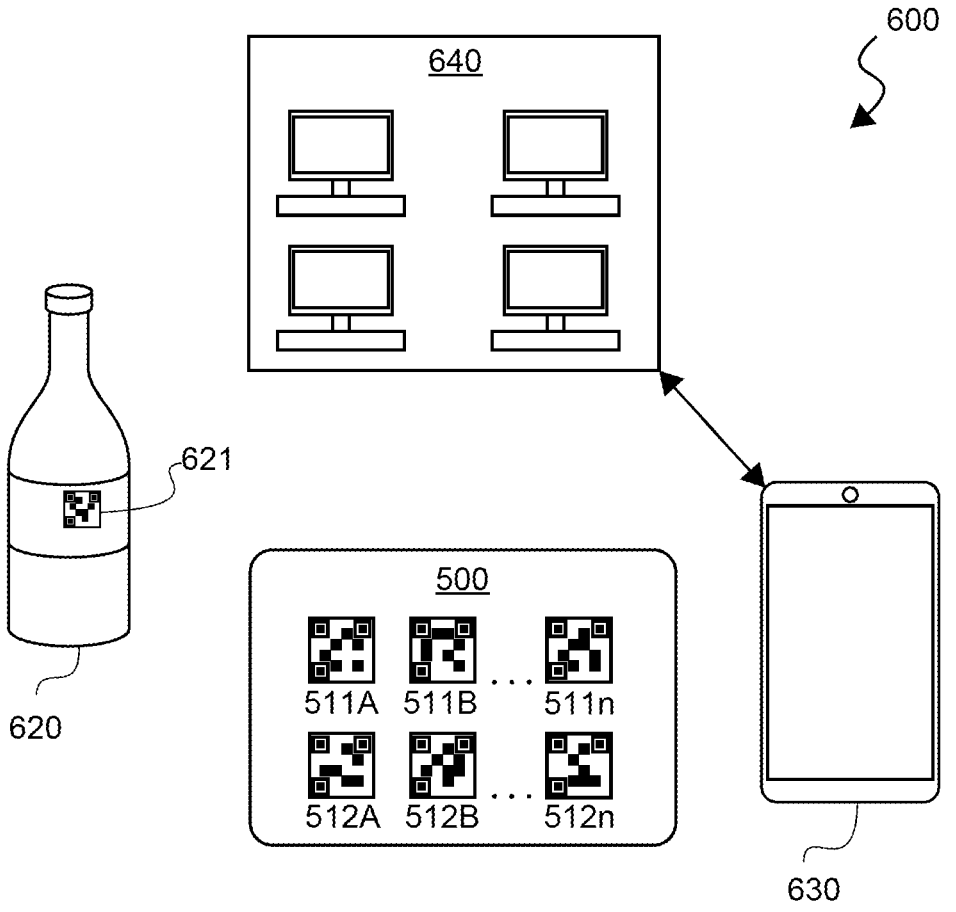
FIG. 6 shows diagrammatic view of a system that uses the card of FIGS. 5A-5B, according to these embodiments of the inventive subject matter.

FIG. 6 shows diagrammatic view of a system that uses card 500, according to these embodiments of the inventive subject matter. The various computing components of system of FIG. 6 can be identical to, or even the same as those of the embodiment of FIG. 1, with the additional programming to execute the processes discussed below associated with these embodiments.

The system 600 of FIG. 6 includes a real-world good 620 that can have a copy 621 of the first public key 511a from the card 500. The system 600 further includes user devices 630 that are used by users to interact with the system. Though only one user device 630 is shown, it is understood that multiple users accessing the system will have their own devices 630.

Computing device 630 includes a processor and non-transitory computer-readable memory. Computing device 630 also includes a sensor capable of reading the public keys and private keys used in the inventive subject matter. The sensor can be a camera or other sensor capable of reading a QR code, a barcode, or other machine-readable code. The computing device 630 can also be programmed to detect and read alphanumeric codes captured by the camera. The computing device 630 includes hardware and software necessary for data exchanges over data-exchange networks via wireless and/or wired connections.

Computing device 640 can be one or more computer systems that are programmed to execute the processes discussed herein. The computer system 640 includes at least one processor and at least one non-transitory computer-readable medium that stores the instructions that execute the processes described herein. The computer system 640 can communicate with other computing devices such as devices 630 in order to send and receive information related to the physical goods 620 and the ownership thereof. In embodiments, the computing system 640 can include the computing device 630.

Figure 7:
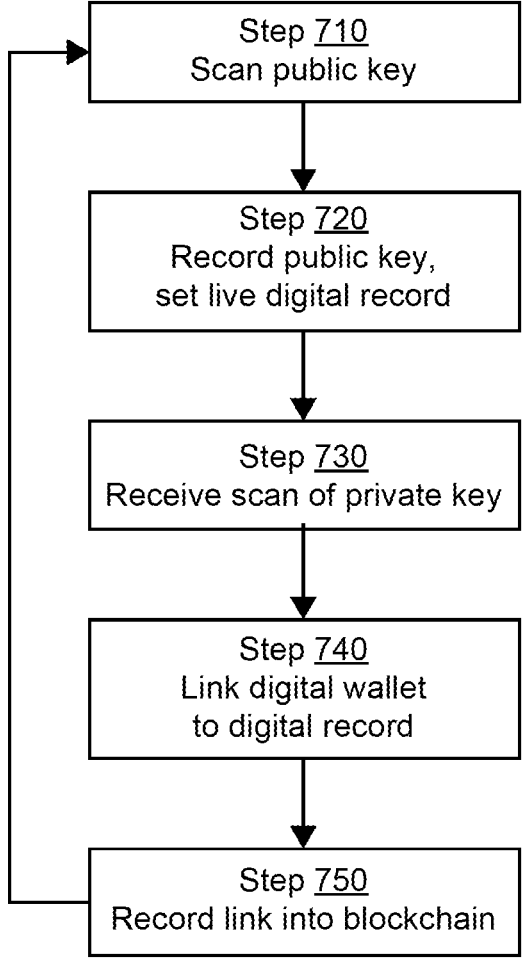
FIG. 7 is a flowchart of the processes executed by the system of the embodiment of FIGS. 5A-6 of the inventive subject matter.

FIG. 7 is a flowchart of the processes executed by the system of this embodiment of the inventive subject matter.

At step 710, the computing device 640 receives a scan of a first public key 511*a* from the card 500. As noted above, the public key 511*a* can comprise a first information address for a first digital record associated with the real-world good 620.

The digital record can be a record indicating ownership tied to that particular public-private key pair. The digital record can, in embodiments, include information about the owner. In embodiments, the digital record can also include an image of the real-world good 620. The digital record can be stored on computing device 640 or other database accessible to computing device 640.

At step 720, the computing device 640 records the receipt of the first public key and as such, denotes the first digital record as the "live" digital record for the purposes of ownership of the real-world good 620. The "live" digital record is considered to be the digital record that currently governs ownership. That is, no other record is recognized by the computing device 640.

At step 730, the computing device 640 receives a scan of the first private key 512*a* from the user device 630, that corresponds to the first public key 511*a*. Along with the scan of the first private key 512*a*, the user device also sends the computing device 640 information about the user used to record the ownership. The information can include a link or other information address belonging to a digital wallet of the user. The information can also include information about the user themselves such as a name, location, etc., that can be used to update the first digital record. In embodiments, the information (including private information) can be encrypted using the private key 512*a*. In these embodiments, the encrypted user information is sent separately from the private key 512*a* to increase security.

At step 740, the computing device 640 links the user's digital wallet to the first information address corresponding to the first digital record associated with the real-world good.

At step 750, the computing device 640 records the link between the user's digital wallet and the first digital record as a transaction in a blockchain.

In most embodiments, the blockchain can be public blockchain (e.g., Ethereum, etc.). In some embodiments, the blockchain can be a private blockchain owned and/or managed by a service.

When the real-world good 620 changes ownership (such as by sale, for example), the steps 710-750 are repeated with each subsequent public key (511*b* through 511*n*) and corresponding private key (512*a*-512*n*). In this example, the card 500 is physically given to a second user as part of the transaction. The cover obscuring second public key 511*b* and second private key 512*b* can be scratched off to reveal the keys on the card 500.

Thus, for a second user, repeating step 710, the computing device 640 receives a scan of the second public key 511*b* from a second device associated with a second user, which includes a second information address for a second digital record associated with the real-world good. The computing device 640 at a repeat of step 720 then denotes the second digital record as the "live" record. This replaces the first digital record as the live record, and thus the first digital record is no longer considered for ownership of the real-world good 620.

Repeating step 730, the computing device 640 then receives a scan of the second private key 512*b* from the second user device along with other information used to record the new ownership. Repeating step 740, the computing device 640 links a digital wallet belonging to the second user to the second information address corresponding to the second digital record of the real-world good 620.

Finally, executing step 750 once again, the computing device 640 records the new ownership by recording the link between the second user's digital wallet and the second digital record as a transaction in the blockchain.

This process can be repeated for as many public-private key pairs that exist on the card. In variations of these embodiments, the system can have multiple cards. Thus, a second user can have a card with just the second public and private keys 511*b*, 512*b* on them or with these and additional keys. Additionally, when a final public-private key pair 511*n*, 512*n* is reached, additional cards 500 can be generated such that the transfer of the physical good 620 can continue.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for securely verifying and tracking ownership of a limited good, comprising:

a public key affixed to a physical good;

a card comprising:

a copy of the public key imprinted on the card;

a first private key imprinted on the card, the first private key obscured by a first single-use cover;

at least one second private key imprinted on the card, the at least one second private key obscured by at least one second single-use cover; and a computing system programmed to:

receive a scan of the public key;

generate a first block on a blockchain based on the scan of the public key;

encrypt the blockchain using the public key;

receive a scan of the first private key and at least one item of ownership information, the at least one item of ownership information reflecting a change in ownership of the physical good;

decrypt the blockchain using the first private key; and generate a second block on the blockchain based on the scan of the first private key, the second block including a second record of ownership based on theat least one second item of ownership information.

2. The system of claim 1, wherein the computing system is further programmed to:

encrypt the blockchain that includes the second block with the first private key;

receive a scan of the second private key; and decrypt the blockchain with the second private key.

3. The system of claim 1, wherein the physical good is one of a series of identical physical goods, wherein the series of identical goods is of a production run having a certified number of the identical physical goods.

4. The system of claim 3, wherein the computing system is further programmed to store data that comprises the certified number of the identical physical goods.

5. The system of claim 4, wherein the card further comprises a third private key imprinted on the card obscured by a third single-use cover, and wherein the computing system is further programmed to:

receive a scan of the third private key;

decrypt the blockchain using the third private key;

generate a third block on the blockchain based on the third private key, wherein the third block includes information indicating the physical good has been destroyed; and updates the data comprising the certified number of the identical physical goods to reflect the destruction of the physical good.

6. The system of claim 1, wherein the single-use cover and at least one second single-use cover comprise scratch-off covers that obscure the first private key and the at least one second private key, respectively.

7. The system of claim 1, wherein the single-use cover and at least one second single-use cover comprise adhesive covers that obscure the first private key and the at least one second private key, respectively.

8. The system of claim 1, wherein each of the public key, the first private key and the at least one second private key comprise at least one of a QR code, a barcode, or an alphanumeric number.

9. The method of claim 1, wherein the step of receiving a scan of the public key includes receiving an initial item of ownership information and the first block is generated based on the public key and the initial item of ownership information.

10. The method of claim 1, wherein at least one of the public key, the first private key and the second private key are printed such that they are invisible to a naked eye.

11. The method of claim 1, wherein the public key comprises a QR code covering at least 50% of the card and the first single-use cover forms a part of the QR code, the method further comprising:

removing the first single-use cover, wherein the area under the first single use cover changes the QR code and wherein the changed QR code comprises the first private key.

12. A system for ensuring secure transfer of valuable goods, comprising:

a card including at least:

a first private key;

a first public key corresponding to the first private key, wherein the first public key comprises a first information address for a digital record corresponding to a real-world good;

a second private key;

a second public key corresponding to the second private key, wherein the second public key comprises a second information address for a second digital record corresponding to the real-world good;

a computing device programmed to:

receive a scan of the first public key from a user device operated by a user;

obtain the first information address for a digital record of the real-world good based on the first public key;

receive a scan of the first private key from the user device;

link the first information address of the real-world good to a digital wallet associated with the user based on the first private key; and record the link as a transaction in an existing blockchain.

13. The system of claim 12, wherein the computing device is further programmed to:

receive a scan of the second public key from a second user device operated by a second user;

obtain the second information address for a digital record of the real-world good based on the second public key;

receive a scan of the second private key from the second user device;

link the second information address of the real-world good to a second digital wallet associated with the second user based on the second private key; and record the link as a second transaction in the existing blockchain.

14. The system of claim 12, further comprising wherein the digital record includes an image of the real-world good.

15. The system of claim 12, wherein the digital record includes ownership information and wherein receiving the scan of the first private key further comprises receiving updated ownership information associated with the first user.

16. The system of claim 15, wherein the updated ownership information is encrypted using the first private key.

17. The system of claim 12, further comprising a second card, the second card including the second private key and the second public key.

18. The system of claim 12, wherein the existing blockchain is a public blockchain.

* * * * *